Nov. 12, 1963   C. F. HOBSON, JR., ET AL   3,110,848
ELECTRIC CIRCUIT BREAKER
Filed Sept. 15, 1960   3 Sheets-Sheet 1
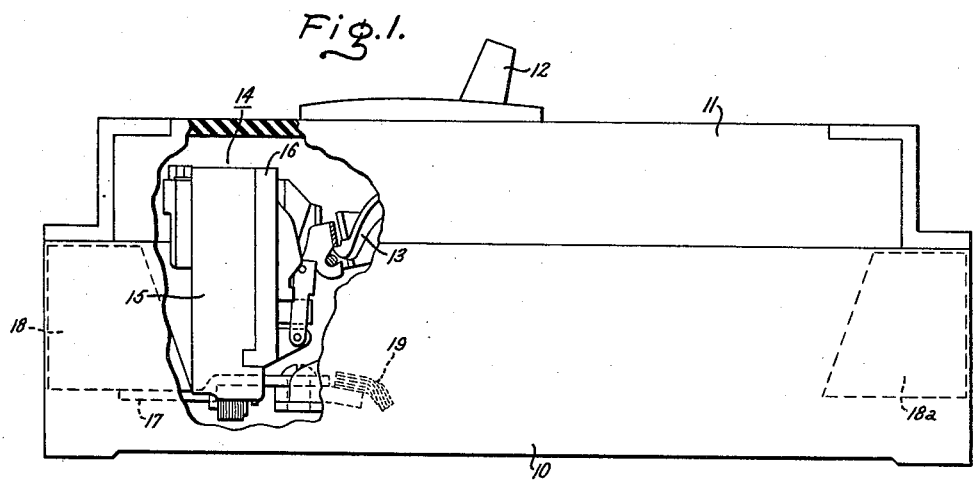
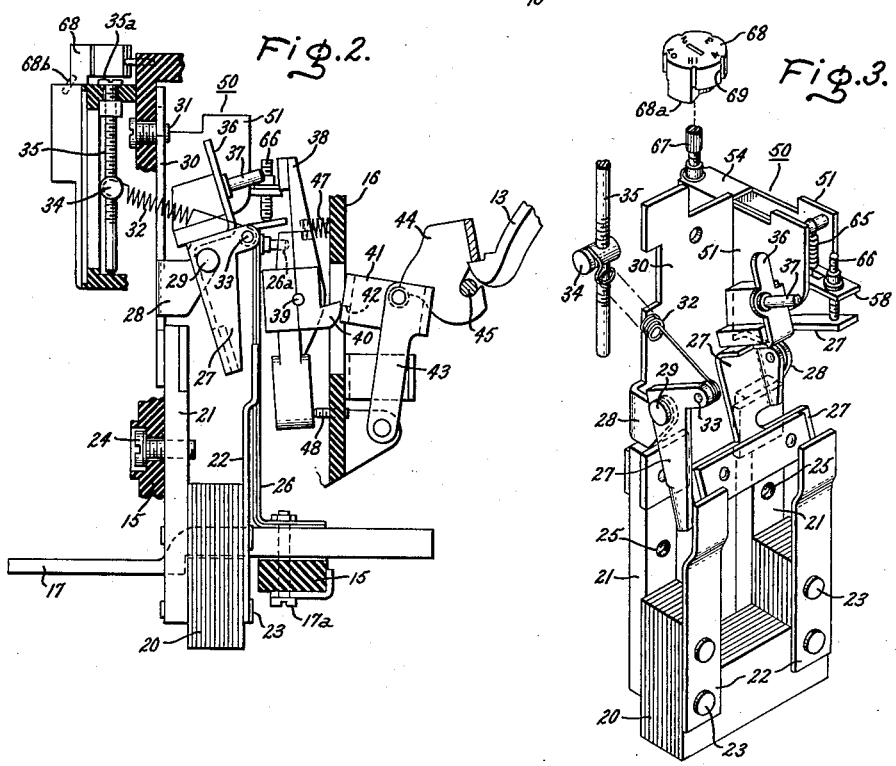
INVENTORS:
Charles F. Hobson, Jr.
Frank H. Murphy,
by Robert T. Casey
Attorney.

Nov. 12, 1963 C. F. HOBSON, JR., ETAL 3,110,848
ELECTRIC CIRCUIT BREAKER
Filed Sept. 15, 1960 3 Sheets-Sheet 2

INVENTORS:
Charles F. Hobson, Jr.,
Frank H. Murphy,
by Robert F. Casey
Attorney.

Nov. 12, 1963 C. F. HOBSON, JR., ETAL 3,110,848
ELECTRIC CIRCUIT BREAKER
Filed Sept. 15, 1960 3 Sheets-Sheet 3
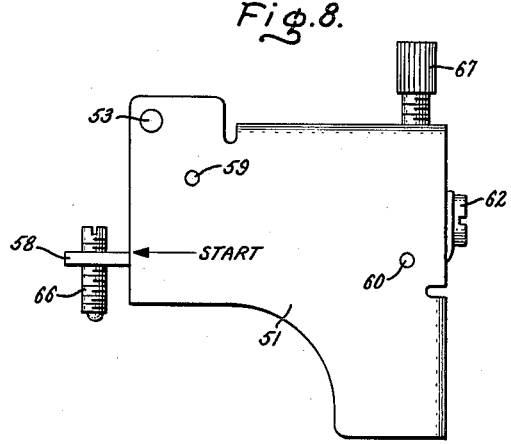
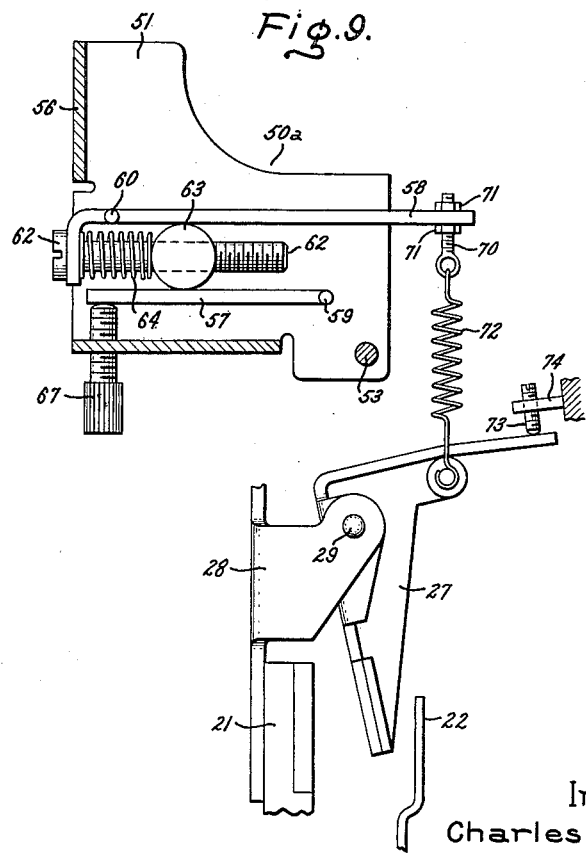
Inventors:
Charles F. Hobson, Jr.
Frank H. Murphy,
by Robert F. Casey
Attorney.

3,110,848
ELECTRIC CIRCUIT BREAKER
Charles F. Hobson, Jr., Southington, and Frank H. Murphy, Hartford, Conn., assignors to General Electric Company, a corporation of New York
Filed Sept. 15, 1960, Ser. No. 56,302
24 Claims. (Cl. 317—176)

Our invention relates to electric circuit breakers and particularly to electric circuit breakers including adjustable current-responsive means for causing automatic opening or "tripping" of the circuit breaker upon the occurrence of predetermined electrical conditions. Electric circuit breakers of the type referred to include a control knob which the user can move to various positions on a pre-calibrated scale, such as "low," "medium" and "high," to adjust the tripping of the breaker.

In a particular instance, for example, as applied to a "magnetic" or "instantaneous-acting" trip device, when the control knob is at the "low" setting, the breaker will trip at 5X ("X" = normal current-carrying rating of breaker), and at the "high" setting that it will trip at 10X. Since the "high" and "low" positions of the knob are marked on the circuit breaker casing or on the knob, it is necessary to adjust the trip device itself during manufacture so that it will operate at the desired values at each of the desired settings.

Heretofore, difficulties have been encountered in making such manufacturing adjustments because of the characteristics of prior trip devices. Thus, for example, once adjustment has been made for establishing the "low" setting, subsequent adjustment for establishing the correct "high" setting destroys the accuracy of the previous setting. Much time and effort is therefore required to obtain accurate settings with such devices. Also, with prior trip devices, the general range of adjustment has been restricted by the particular design. While it is possible to move the adjustment range, such as from a range of 5X–10X to a range of 7X–12X, it is not possible to substantially change the extent of the range itself, such as to a range of 5X–15X.

It is an object of the present invention to provide an electric circuit breaker including a tripping device which is capable of adjustment over a predetermined range, wherein the end points of the operating range may be adjusted independently of each other.

It is another object of the invention to provide an electric circuit breaker including magnetic or "instantaneous" acting tripping means which is adjustable between predetermined settings and in which the low setting is adjustable independently of the high setting.

It is another object of the invention to provide an electric circuit breaker having a tripping device including means which may be operated by the user to vary the tripping point of the breaker within a predetermined range, and which may be pre-set during manufacture to provide a narrow or relatively wide range, selectively.

In accordance with the invention in one form, we provide an electric circuit breaker including a pair of relatively movable contacts and a member releasable to cause automatic opening of the contacts, together with means normally restraining said releasable member. Current-responsive means is also included for moving the restraining member to cause automatic opening of the contacts. The current-responsive means includes an electromagnet, an armature, and means for adjusting the position of the armature to determine the tripping point of the device. The means for adjusting the armature includes a manually movable adjusting member which is movable between two predetermined fixed limits and a second movable member, the position of which is to be adjusted in response to movement of the first member to adjust the armature. Motion-transmitting means is provided interconnecting the first and second members, and the motion-transmitting means is itself adjustable to vary the amount of movement produced in the second member by a given amount of movement of the first member such adjustment being carried out without altering the relative positions of said members in one predetermined setting.

In a particular embodiment, we provide a first pivoted member, a second pivoted member generally parallel to the first member, and a coupling link being slidable along the first and second members for varying the mechanical advantage of the motion transmittal system between them.

Additional objects and advantages of my invention will be in part set forth and in part become apparent from the following detailed description taken in conjunction with the accompanying drawings, and its scope will be set forth in the appended claims.

In the drawings:

FIGURE 1 is a side elevation view of an electric circuit breaker embodying the present invention, the casing being partially broken away;

FIGURE 2 is an elevation view, partially in section, of the tripping device portion of the circuit breaker of FIGURE 1;

FIGURE 3 is a perspective view of a portion of the tripping apparatus of FIGURE 2;

FIGURE 8 is a view of a modified adjusting assembly, and

FIGURE 9 is a view similar to FIGURE 4, showing a second modified adjusting assembly.

Figure 4:
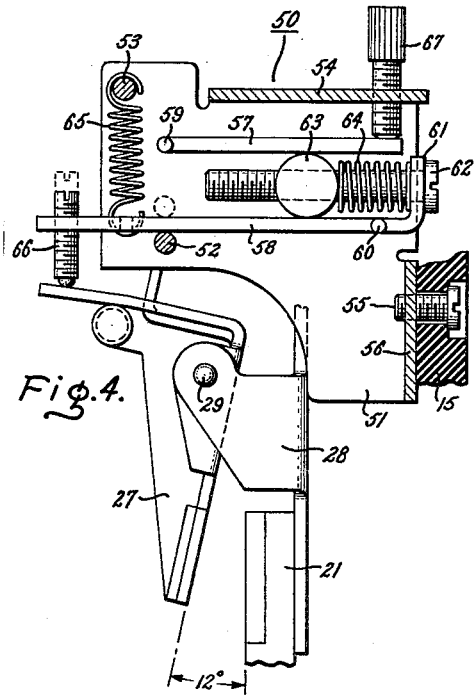
FIGURE 4 is an elevation view of the armature adjusting portion of the trip unit device of FIGURES 2 and 3.
Figure 5:
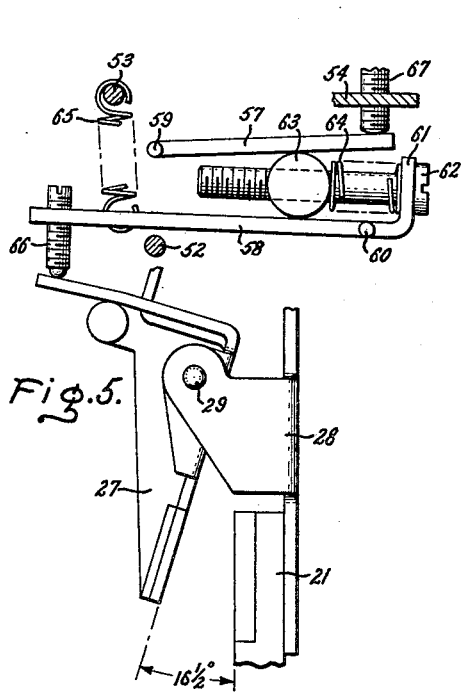
FIGURE 5 is a view similar to FIGURE 4 but showing the parts in a first adjusted position.

The invention is shown as embodied in an electric circuit breaker of the type having a molded insulating casing, such for example as shown in Patent No. 2,921,169, assigned to the same assignee as the present invention. The circuit breaker includes an insulating casing having a base 10 and a cover 11. The casing contains a plurality of stationary contacts, not shown, a plurality of corresponding movable contacts, not shown, and operating mechanism for moving the contacts between open and closed circuit positions by means of the manually operable handle 12. The operating mechanism includes a releasable member 13 which is biased by spring means, not shown, so that when it is released, it causes automatic opening of the contacts and interruption of the circuit.

Trip Unit Construction

For the purpose of normally restraining the releasable member 13 and for releasing it upon the occurrence of predetermined current conditions through the circuit breaker, a "trip unit" 14 is provided. The trip unit 14 includes an insulating casing 15 which is generally rectangular or box-like and serves to enclose and support the parts to be described. The insulating casing for the trip unit 14 includes a generally hollow box-like body 15 having its front wall closed by an insulating cover 16. Mounted on the bottom wall of the insulating body 15 is a relatively heavy strap-like conductor 17, only one of which is shown, for each of the three poles of the circuit breaker. The conductors 17 are connected at one end to cable connectors 18, only one shown, and at the other end to flexible conductors 19, which in turn are connected to the movable contacts, not shown. The current, therefore, is brought in to the terminals 18 at one end of the circuit breaker, passes through the conductors 17 of the trip unit 14, and through the flexible conductors 19, to the movable contacts, to the stationary contacts, to the outgoing terminals or connectors 18a.

Mounted on the insulating body 15 is a generally U-shaped laminated magnetic core member 20 (see FIG. 2). The core member 20 carries a pair of main poles extensions 21 and a pair of auxiliary or "back-drag" pole extensions 22. The main and auxiliary pole members 21 and 22 are mounted on opposite faces of the core member 20 by means of the rivets 23 passing through the core member 20 and headed over the respective pole members.

The assembly comprising the core member 20 its main pole members 21 and its auxiliary or "back-drag" pole member 22 is supported in the insulating housing 15 by means of screws 24 which pass through a portion of the insulating casing 15 and into threaded engagement in holes 25 in the main pole members 21.

The conductive strap 17 is attached to the insulating base 15 by means of the screw 17a. The screw 17a also serves to mount a bimetallic strip 26 which has its foot portion bent over into contact with the strap 17.

The construction of the circuit breaker and trip unit as thus far described is conventional, as shown, for example, in aforesaid Patent Number 2,921,169.

Supported between the main pole portions 21 and the auxiliary pole portions 22 is a movable armature 27, which is pivotally supported at 29 between two lugs 28 bent up from a fixed supporting frame 30. The supporting frame member 30 is rigidly held in place by parts fitting into conforming recesses in the insulating body 15 and also by means of the screw 31. The armature 27 is biased counter clockwise, toward "open" position, by means of a bias spring 32 which has one end attached to the armature 27 at 33 and which has its other end attached to a traveling nut 34 which rides along a threaded stud member 35. The head 35a of the stud 35 is accessible externally from the top of the housing 15. It will be observed that rotation of the threaded member 35 causes upward or downward movement of the traveling nut 34 thereby changing the angle of the spring 32 with respect to the pivot point 29 of the armature member. The armature assembly also serves to support a bracket 36 carrying a projecting plunger member 37, which is adapted to engage and rotate a trip bar 38 in a manner to be described.

In operation, passage of current through the conductor strap 17 creates a magnetic field in the U-shaped core 20 which appears at its main and "back-drag" poles 21 and 22 respectively. Since the armature 27 is normally positioned closer to the poles 21 than to the poles 22, it is initially attracted primarily by the flux created at the poles 21. When the total flux increases greatly, however, the pull from the main poles 21 exceeds that from the "back-drag" poles 22, and the armature 27 moves to the left as viewed in the FIGURE 2, causing the plunger 37 to engage the trip bar 38, moving it clockwise as viewed.

The trip bar 38 is an elongated member of insulating material extending across all three poles of the circuit breaker and supported on a pivotal support 39 in the trip unit housing. At one point along its length, preferably the center portion in a 3-pole device, the trip bar is provided with a retaining cam 40 which normally engages and restrains a latch member 41 from movement. When the cam member 40 is rotated sufficiently, it drops off of the shoulder 42 into the cutaway portion of the latch member 41. When this occurs, the link 43 is freed to move to the left as viewed in FIGURE 2 thereby permitting the intermediate latch member 44, which is pivotally supported on the pin 45, to rotate in a counterclockwise direction, thereby releasing the releasable member 13 to cause automatic opening of the circuit breaker, as previously described.

The trip bar 38 is constantly biased in a counterclockwise direction by means of compression spring 47, acting between it and the vertical surface of the cover 16. Motion of the trip bar in a counterclockwise direction is limited by the adjustable stop screw 48 carried by the cover portion 16. The bimetallic strip 26 also carries a plunger or adjustable screw member 26a, which engages the trip bar 38 when the bimetallic strip is warped to the right as viewed in FIGURE 2, thereby also functioning to cause automatic opening of the circuit breaker. It should be understood that the inclusion of the bimetallic strip 26 is optional, and its inclusion or omission in no way affects the operation of the magnetic tripping apparatus.

*Armature Adjusting Mechanism*

For the purpose of making it possible for the customer or user to select, within a predetermined range, the exact point of operation of the magnetic tripping device, there is provided a manual adjusting mechanism indicated generally at 50, and shown in greater detail in FIGURES 4–7.

The adjusting mechanism 50 includes a pair of supporting side plates 51, interconnected and spaced apart by supporting pins 52 and 53, and by a bridging bight portion 54. The assembly 50 is mounted on the insulating housing 15 by means of screw 55 extending into the end wall portion 56.

As shown in FIGURE 4, the adjusting mechanism includes a pair of elongated levers 57 and 58, pivotally supported between the side walls 51 by pins 59 and 60 respectively.

The lever 58 has one end 61 bent at right angles to provide a supporting base for a screw 62 which is rotatably trapped thereby and which carries an adjustable barrel or cylindrical member 63. A compression spring 64 is compressed between the barrel 63 and the foot portion 61. Rotation of the screw 62 in one direction, therefore, causes the cylindrical barrel 63 to travel in one direction along a length of the screw 62, and rotation in the opposite direction causes it to travel in the other direction. The compression spring 64 serves to maintain the barrel 63 in any particular predetermined position, despite vibration, etc. The lever 58 is biased in a clockwise direction about its pivot 60 by means of a tension spring 65 extending between the lever 58 and the fixed pin 53. The lever 58 also carries adjacent its outer end, an adjustable screw member 66, the end of which is adapted to engage a portion of the armature assembly 27 for a purpose to be described. A manually engageable adjustable screw 67 is threadedly engaged in the bight portion 54, and has its inner end in engagement with the lever 57. An insulating nob 68, see FIGURE 3, is provided, mounted on the projecting end of the screw 67 and carrying a pointer or indication of the various possible settings of the knob. The outer periphery of the insulating knob 68 is also provided with axially extending grooves 69, each corresponding to a particular setting of the knob, the grooves being adapted to co-act with resilient positioning means, not shown, for resiliently retaining the knob in predetermined positions.

*Operation*

Referring to FIGURE 4, rotation of the manually adjustable screw 67 causes the inner end thereof to move the lever 57 clockwise as viewed in FIGURE 4, or permits it to move counterclockwise under the effect of the bias spring 65, acting through the barrel 63. Motion of the adjusting screw 67, therefore, moves both of the levers 57 and 58.

Figure 6:
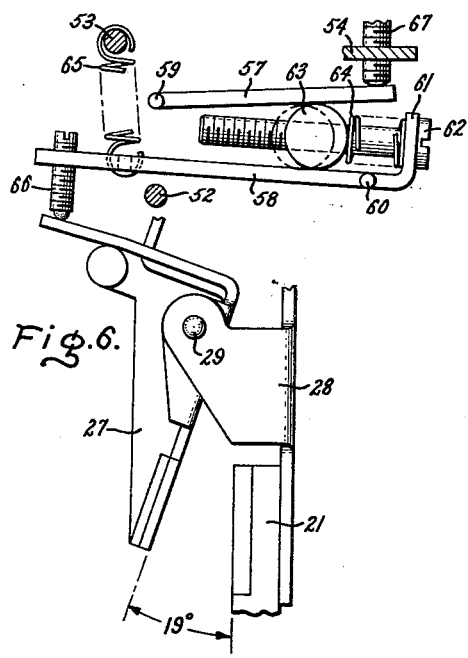
FIGURE 6 is a view similar to FIGURE 4 but showing the parts in a second adjusted position.
Figure 7:
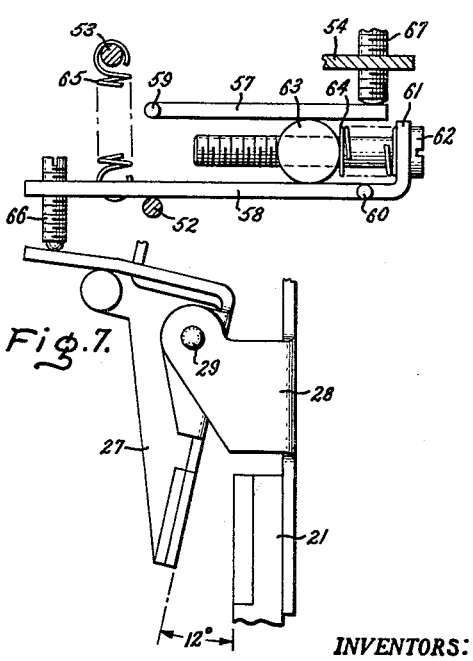
FIGURE 7 is a view similar to FIGURE 4 showing the condition of the parts after said second adjustment but with the device returned to the general condition of FIGURE 4.

The calibration process for the magnetic tripping device is generally as follows. The adjusting screw 67 is set so that the levers 57 and 58 are exactly parallel to each other. With these links maintained in this position, the adjusting screw 66 is moved in or out and the armature bias spring 32 is adjusted, to provide the "low" setting, i.e., that condition of the parts which will cause the trip device to operate at the lowest desired current level, such as 5X. This position is determined by actual electrical tests, such as by passing the required amount of current through the device and adjusting the screw 66 until tripping occurs. When the "low" setting has been made in this manner, the customer's control knob 67 is rotated counterclockwise as far as it will go. The customer's adjusting knob 68 is permitted to rotate only a predetermined amount. Rotation may be limited in a suitable manner such, for example, as by the provision of a projecting boss 68a on the knob 68, and a suitably positioned stop projection 68b on the casing 15, see FIGURE 2. This allows the lever 57 to move slightly in a counterclockwise direction (upward), and permits the lever 58 to move slightly in a clockwise direction (upward) under the influence of the spring 65. It is ordinarily desired that this new setting of the customer's control knob should place the parts in a position where they will trip at the highest desired setting, in this case corresponding to the maximum desirable air gap. Due to various electrical mechanical variations in circuit breakers components and materials, it will ordinarily be found that the armature at this position is in some position other than the desired maximum setting position. Further adjustment of the screw 66, or adjustment of the spring 32, might be used to correct this setting. It will be observed, however, that any change of the screw 66 or of the spring 32 have the effect of also changing the initial or "low" setting. For this reason, the screw 66 and spring 32 are not adjusted. Instead, the adjusting screw 62 is rotated to move the barrel 63 longitudinally along the shaft of the screw 62. This causes a change in the position of the lever 58, and therefore a change in position of the armature. Thus in FIGURE 5, motion of the barrel 63 to the left causes motion of the lever 58 in counterclockwise direction, while motion of the barrel 63 to the right causes motion of the lever 58 in a clockwise direction. Thus, for example, if the gap opening existing when the knob 67 is moved to the "high" setting is found to be too small, the screw 62 is turned so as to move the barrel 63 to the right as viewed in FIGURE 5. This change is shown in FIGURE 6, in which the barrel member 63 has been moved to the right slightly permitting a greater opening of the armature, for example, 19 degrees, as compared to 16½ degrees in FIGURE 5.

At the same time, it will be observed that by rotating the customer's control knob and screw 67 again back to the initial position shown in FIGURE 4, the initially adjusted "low" position has not been changed. Thus it will be observed that, in the positions of FIGURE 4 and FIGURE 7, the links 57 and 58 are exactly parallel with each other, and therefore any motion of the barrel 63 longitudinally parallel to the links has no effect on their relative positions.

The minimum and maximum adjustments are therefore independent of each other. In other words, with the apparatus of the present invention, it is possible to set the magnetic device at the desired low setting and then to regulate the amount of motion of the armature from this low setting which is produced by a fixed amount of movement of the customer's adjusting knob. This provides, in effect, a variable mechanical-advantage between a control input and a control output. This also permits the use of predetermined scales for the settings used on the customer's control knob, even though the actual amount of movement of the controlled member, i.e., the armature, is not known until final assembly and testing.

As has been stated, the adjusting mechanism 50 provides a variable mechanical-advantage linkage between the input adjusting screw 67 and the output positioning screw 66. Thus, for example, when the barrel 63 is midway between the pivots of 59 and 60, a given angular movement of the lever 57 produces equal angular movement of the lever 58. When the barrel 63 is moved close to the pivot 60, a relatively small amount of movement of the lever 57 produces much greater movement of the lever 58, thereby amplifying the movement of the lever 57. When the barrel 63 is moved close to the pivot 59, on the other hand, a relatively great movement of the lever 57 produces only a slight movement of the lever 58. In other words, the motion of the lever 57 is compressed. Thus a very great range of rates of adjustment is made possible, theoretically from zero to infinite compression in the other direction.

The stop pin 52 is utilized as a stop for lever 58, in order to easily determine the parallel or starting position of the levers 57 and 58. It will be noted that with the stop pin 52 located as shown in FIGURES 4-7, it serves to limit travel of the lever 58 in gap-closing direction.

This arrangement is especially desirable when the device is to be used in locations which are subject to physical shock or vibration. Thus, it will be observed that the pin 52 restricts shock-induced motion of the lever 58 to a point short of that at which it might cause undesired tripping.

For use in applications which are not subject to such shock, however, we prefer to mount the stop pin 52 above the lever 58, in the position shown in dotted lines in FIGURE 4.

When the pin 52 is mounted in the dotted position, i.e., above the lever 58, the adjusting process is changed so that when the levers 57—58 are parallel, the screw 66 is adjusted so that the armature 27 occupies its "high" or maximum-gap position rather than its "low" or minimum-gap position. This arrangement is preferred in such cases because certain advantages result from adjusting the "high" setting first, and then the "low" setting. Thus, for example, once the screw 66, the spring 32, are adjusted to provide the desired "high" or maximum-gap setting, it will always be possible to attain any desired "low" setting by adjusting the barrel or link 63, since the armature may be moved to any lesser gap position, no matter how small. On the other hand, if the "low" setting is adjusted first, it may be found that when the armature is subsequently moved to its maximum open position, as limited by the construction and placement of parts, the high setting desired is not yet reached, and it may be desired to adjust the spring 32 so as to increase the bias. This, of course, would affect the previously-set "low" setting, and require its readjustment.

If desired, the pin 52 may be omitted and other means utilized to indicate the normal or starting parallel positions of the levers, such for example, as by means of marking on the outer surface of the side plate 51, see FIGURE 8.

In the modification illustrated in FIGURE 9, the adjusting assembly 50a is of similar construction to the assembly 50 of the previous form, excepting that the bias spring 65 and the adjusting screw 66 of the first form are omitted. The adjusting screw 66 is replaced by an adjustable eye-bolt 70 retained on the lever 58 by means of locking nuts 71. A tension spring 72 is mounted between the eye 70 and the armature 27 and constantly biases the armature 27 toward "open" position against an adjustable stop screw 73 threadedly engaged in a suitable stationary support such as 74. The stop pin 52 is also omitted, and the parallel positions of the levers 57 and 58 is determined by suitable marking, as described previously.

In operation, the levers 57 and 58 are first brought to a parallel position and the device is set for operation at a predetermined desired level by adjusting the armature gap stop screw 73 and/or the eye screw 70, to adjust the bias exerted by the spring 72. Following such initial adjustment, the customer's adjusting screw 67 is rotated the predetermined permitted amount. A check is then made at this setting as to whether the device operates at the desired level of current. If it does not, the adjusting screw 62 is operated to move the barrel 63 longitudinally along the screw 62, thereby varying the bias exerted by the spring 72. When the desired adjustment is achieved, it will be observed that returning the adjusting screw 67 the same amount of rotation to its original position, will return the levers 57 and 58 to their original position and will, therefore, return the bias of the spring 72 to its originally set amount.

While we have described only two particular embodiments of the invention, it will be readily apparent that many modification thereof may be made by those skilled in the art. It is, therefore, intended by the appended claims to cover all such modifications as fall within the true spirit and scope of the invention.

What we claim as new and desire to secure by Letters Patent of the United States is:

1. Control apparatus comprising in combination, a first movable control member, a second movable control member, and motion transmitting means interconnecting said first and second control members establishing a first position of said second member when said first member is in a corresponding first position, and means for varying the mechanical advantage of said motion transmitting means without affecting the relative positions of said first and second members when said first member is in said first position.

2. Control apparatus comprising in combination, a first movable control member, a second movable control member, means interconnecting said first and second control members establishing a first position of said second member when said first member is in a first position, means for adjusting varying said first position of said second member while retaining said first member in said first position, and means for varying the effect of movement of said first member upon said second member without affecting the corresponding positions of said first and second members when said first member is in said first position.

3. Control apparatus comprising in combination, a first movable control member, a second movable control member, at least one of said control members being pivotally supported, motion transmitting means interconnecting said first and second members establishing a first position of said second member when said first member is in a first position, said motion transmitting means being adjustable to act on said pivotally supported member at points closer to or farther away from the pivotal support thereof without altering the said first position occupied by said second member when said first member is in its said first position.

4. Control apparatus as set forth in claim 3 wherein said apparatus also includes means for adjustably varying said first position of said second member without altering said first position of said first member.

5. Control apparatus as set forth in claim 4, wherein said interconnecting means comprises a member having a pivotal connection with each of said first and second members.

6. Control apparatus comprising in combination, a first movable control member, a second movable control member, means pivotally supporting said second control member, means interconnecting said first and second control members establishing a first position of said second member when said first member is in a first position, said interconnecting means being adjustable to act on said pivotally supported member at points lying along a first predetermined path closer to or farther away from said pivotal support, said interconnecting means including at least a portion which is bodily movable along a second predetermined path which is parallel to said first predetermined path when said pivotally supported member is in said first position, whereby the relative amounts of movement of each of said first and second members may be varied without affecting the position of said second member when said first member is in said first position.

7. Control apparatus comprising a first pivotally supported member, a second pivotally supported member, means interconnecting said first and second members establishing a first position of said second member when said first member is in a first position, said interconnecting means having a slidable pivoted connection with each of said first and second members to vary the motion transmitted therebetween, the paths of movement of said slidable connections being parallel to each other when said first and second members are in said first positions respectively, whereby said motion transmitted between said first and second members may be varied without affecting the position occupied by said second member when said first member is in said first position.

8. Control apparatus comprising in combination, a first pivotally supported control member, a second movable control, a connecting link pivotally connected to said first member at a point eccentric to the pivot thereof at one end and connected to cause movement of said second member at its other end, said connecting link establishing a first position of said second member when said first member is in a first position, said connecting link having its point of connection with each of said first and second members movable along paths which are parallel to each other when said first member is in said first position.

9. Control apparatus comprising in combination, a support, a first member pivotally supported on said support and having a first planar surface, a second member pivotally supported on said support and having a second planar surface, the pivot of said second member being displaced with relation to the pivot of said first member, said second member including a support portion extending substantially at right angles to said second planar portion, an elongated threaded stud rotatably carried by said support portion and extending generally parallel to said second planar surface, a generally cylindrical spacer carried by said stud in threaded engagement therewith so that rotation of said stud causes said spacer to travel along said stud parallel to said second planar surface, spring bias means carried by said support biasing said second member for rotation about its pivotal support, said first member having its said first planar surface in engagement with said spacer on a side opposite that engaged by said first member to limit rotation of said second member under said bias, and an adjusting screw for adjustably positioning said first member.

10. Control apparatus as set forth in claim 9 wherein said apparatus also comprises an actuating projection adjustably carried by said second member.

11. Control apparatus as set forth in claim 9 wherein said apparatus also comprises means for indicating when said first and second planar surfaces are in parallel relation to each other.

12. Control apparatus as set forth in claim 9 wherein said apparatus also comprises stop means carried by said support for arresting movement of at least one of said first and second members in the position in which its planar surface is in parallel relation to the planar surface of the other of said members.

13. Control apparatus comprising a support, a first lever pivotally supported on said support, a second lever pivotally supported on said support at a point displaced from the pivot of said first lever and including a portion extending generally parallel to said first lever toward said pivot of said first lever, a connecting link interconnecting said first and second levers between said pivots, said link being adjustable along said levers between said pivots, means for moving one of said levers, and an adjustable actuating projection carried by the other of said levers.

14. An electroresponsive device comprising a conductor, a first movable member movable in response to predetermined electrical conditions in said conductor, a second movable member movable to adjust the sensitivity of said first movable member to said electrical conditions, means for adjusting said second movable member comprising a manually engageable control member movable through a predetermined fixed range of movement, first adjusting means for adjusting the position of said second movable member when said manually engageable control member is at a first extreme of its possible said range of movement, and second adjusting means for adjusting the position of said second movable member when said manually engageable control member is at the extreme of its predetermined fixed range of movement opposite from said first extreme position, said second adjusting means being capable of adjusting said second movable member without affecting the setting of said second movable member when said control member is in said first extreme position.

15. An electroresponsive device operable in response to predetermined electrical conditions comprising a member movable to adjust the sensitivity of said device to said conditions, a manually engageable control member movable through a predetermined fixed range of movement, means interconnecting said control member and said movable member for adjustably positioning said movable member in response to movement of said interconnecting means comprising means establishing a first position of said movable member when said manual control member is at one end of said predetermined fixed range, and means for adjusting the position of said movable member when said control member is at the other extreme end of said range of movement without interfering with the setting of the movable member when said control member is in said first position.

16. An electroresponsive device operable in response to predetermined electrical conditions comprising a conductor, a pair of terminals for connecting said conductor in an electric circuit, a member movable to adjust the sensitivity of said device to electrical conditions in said conductor, a manually engageable control member movable through a predetermined fixed range of movement, and means interconnecting said manual control member and said movable member for adjustably positioning said movable member in response to movement of said control member comprising means for independently adjusting the position of said movable member when said manual control member is at each of its extreme permitted positions respectively.

17. An electromagnetic device comprising a support, a pair of electrical terminals mounted on said support, an electrical conductor extending between said terminals, a magnetic field piece mounted on said support and adapted to be energized by electric current passing through said conductor, an armature mounted on said support and adapted to be attracted to said magnetic field piece upon the occurrence of predetermined electrical conditions in said conductor, and means for adjustably positioning said armature comprising a manual control member movable through a predetermined fixed range of movement, means interconnecting said manual control member and said armature, said interconnecting means establishing a predetermined position of said armature corresponding to the position of said control member at one extreme of its permitted range of movement, and means for adjustably positioning said armature when said control member is at its opposite extreme setting, said second adjusting means operating without affecting the setting of said armature when said control member is at its first extreme permitted setting.

18. An electromagnetic device comprising a conductor, means for passing an electric current through said conductor, a magnetic field piece constructed and arranged to be energized by said current in said conductor, an armature constructed and arranged to be attracted to said field piece, means for adjustably positioning said armature with relation to said field piece comprising a manually engageable control member movable through a predetermined fixed range of movement, means interconnecting said manually engageable member and said armature comprising means for varying the position of said armature when said control member is at the beginning of its permitted range of movement and means for varying the mechanical advantage between said control member and said armature, whereby to vary the range of movement of said armature resulting from movement of said manual control member.

19. An electric circuit breaker trip unit comprising an insulating casing, an electrical conductor supported on said insulating casing, means for connecting said electrical conductor in an electric circuit, a magnetic field piece carried by said enclosure and adapted to be energized by electric current flowing through said conductor, a magnetic armature disposed to be attracted to said magnetic field piece upon the occurrence of predetermined electrical conditions in said conductor, a manually engageable control member accessible from outside said housing and movable through a predetermined fixed range of movement, means interconnecting said control member and said armature comprising means establishing a predetermined position of said armature corresponding to the position of said control member at a first extreme of its permitted movement, and means establishing a second position of said control member at the opposite extreme of its permitted movement, and means for adjustably varying at least one of said predetermined positions independently of the other.

20. An electric circuit breaker trip unit comprising an insulating casing, an electrical conductor carried by said insulating casing, means for connecting said conductor in an electric circuit, a magnetic field piece carried by said enclosure and disposed to be energized by current through said conductor, a magnetic armature carried by said enclosure and adapted to be attracted by said magnetic field piece, a manually engageable control member having a portion accessible from outside said enclosure and movable through a predetermined fixed range of movement, means interconnecting said manual control member and said armature comprising a first member pivotally supported in said housing, and having a portion engaged by said manual adjusting member, a second member movably supported in said insulating housing and having a portion engaging and moving said armature, and a connecting link extending between said pivoted member and said second movable member, said connecting link being adjustable along said pivoted member toward and away from the pivot thereof, the point of engagement of said connecting link with said second movable member being movable along a path which is parallel to the path of movement of the connection of said link with said pivoted member in at least one adjusted position of said pivoted lever.

21. An electric circuit breaker trip unit comprising an insulating housing, an electrical conductor supported in said insulating housing and having terminals adapted for connection in an electric circuit, a magnetic field piece suported by said insulating housing and disposed to be energized by current in said electrical conductor, a magnetic armature disposed to be attracted to said magnetic field piece upon the occurrence of predetermined electrical conditions in said conductor, a manually engageable control member having a portion accessible from outside said enclosure and movable through a predetermined fixed range of movement, means interconnecting said manually engageable member and said armature member, said interconnecting means including a first adjustable member for adjusting the position of said armature corresponding to the position of said manual control member at a first extreme of its permitted range of movement, and a second adjusting member adjustable to vary the mechanical advantage of the connection between said manual control member and said armature, whereby the span of said range and at least one of its extreme points may be adjustably selected.

22. An electric circuit breaker trip unit comprising an insulating housing, an electrical conductor supported in said insulating housing and having terminal portions arranged for connection in an electric circuit, a magnetic field piece mounted in said enclosure and adapted to be energized by current through said conductor, an electromagnetic armature carried by said enclosure, a manually engageable control member having at least a portion thereof accessible from outside said enclosure and movable through a permitted fixed range of movement, a pair of pivoted levers having the pivot points thereof displaced and having portions extending in substantially parallel relation, said manually engageable member engaging one of said pivoted members and said armature engaging the other of said pivoted members, a connecting link interconnecting said levers, said connecting link being adjustable from a position close to that of one of said pivot points to a displaced position close to the other of said pivot points, and means for adjusting the engagement between said one of said levers and said armature.

23. An electrical circuit breaker trip unit comprising an insulating housing, at least one electrical conductor mounted in said insulating housing and having its ends arranged for connection in an electric circuit, an electromagnetic field piece mounted in said insulating housing to be energized by current passing through said electrical conductor, an electromagnetic armature supported in said insulating housing for attraction to said magnetic field piece, a manually engageable adjusting member having a portion thereof accessible from outside said enclosure, an insulating knob mounted on said portion of said member, means interconnecting said manually engageable member and said armature, first adjusting means for adjusting the position of said armature corresponding to a given position of said manually engageable member, a second adjusting means for adjustably varying the mechanical advantage between said adjusting member and said armature, said manually engageable member having a relatively wide range of adjustment prior to assembly of said insulating knob and a relatively narrow range of adjustment after assembly of said knob.

24. Electrical control apparatus comprising a combination, a relatively stationary magnetic field piece, a relatively movable magnetic armature disposed and arranged for movement toward and away from said magnetic field piece, a relatively stationary stop, biasing spring means acting on said armature and biasing it away from said magnetic field piece and against said stop, means for varying the tension of said biasing spring comprising a first movable control member, a second movable control member, and motion-transmitting means interconnecting said first and second control members establishing a first position of said second member when said first member is in a corresponding first position, and means for varying the mechanical advantage of said motion-transmitting means without affecting the relative positions of said first and second members when said first member is in said first position and means connecting said biasing spring to said second member.

References Cited in the file of this patent
UNITED STATES PATENTS

| | | |
|---|---|---|
| 2,586,326 | Grissinger et al. | Feb. 19, 1952 |
| 2,611,050 | Ponstingl | Sept. 16, 1952 |